Jan. 10, 1950 J. HAANTJES ET AL 2,494,241
CIRCUIT-ARRANGEMENT PRODUCING A DIRECT VOLTAGE
FOR SUPPLYING A CATHODE-RAY TUBE
Filed April 14, 1947 2 Sheets-Sheet 1

J. HAANTJES & B. W. VAN INGEN SCHENAU
INVENTORS
BY
ATTORNEY.

Jan. 10, 1950  J. HAANTJES ET AL  2,494,241
CIRCUIT-ARRANGEMENT PRODUCING A DIRECT VOLTAGE
FOR SUPPLYING A CATHODE-RAY TUBE
Filed April 14, 1947  2 Sheets-Sheet 2

J. HAANTJES & D. W. VAN INGEN SCHENAU
INVENTORS
BY ATTORNEY

Patented Jan. 10, 1950

2,494,241

UNITED STATES PATENT OFFICE 2,494,241

CIRCUIT ARRANGEMENT PRODUCING A DIRECT VOLTAGE FOR SUPPLYING A CATHODE-RAY TUBE

Johan Haantjes and Bernardus Willem van Ingen Schenau, Eindhoven, Netherlands, assignors to Hartford National Bank and Trust Company, Hartford, Conn., as trustee Application April 14, 1947, Serial No. 741,340 In the Netherlands April 17, 1946

6 Claims. (Cl. 315—27)

1

Circuit arrangements are known which produce a direct voltage for supplying a cathode-ray tube in which the direct voltage is produced by rectification of the voltage pulses appearing in an inductance coil through which passes a sawtooth current which mostly controls also the magnetic deflection of the cathode-ray beam of the cathode-ray tube.

Such circuits suffer from the disadvantage that the source of direct voltage obtained has a comparatively high internal resistance, so that a load variation of the source of direct voltage involves a direct voltage variation.

The relative voltage variation per watt direct voltage load is fundamental for the variation of the high direct voltage. This characteristic is practically independent of the fact whether use is made of a simple rectifying circuit for the voltage pulses or of a rectifying circuit in which voltage multiplication occurs, and proves inversely proportional to the energy produced in the inductance coil per stroke of the sawtooth current. This energy requires to have a given value, since it also determines the current through the deflecting coils, which is prescribed in connection with the required reflection of the cathode-ray beam. So the relative voltage variation per watt of the load is fixed.

The disadvantage of the variation of the direct voltage under the influence of the varying load is particularly manifest when using a cathode-ray tube for television-projection purposes. In this case a high direct voltage is required which may be obtained by using a rectifying circuit involving voltage multiplication. In such tubes the load of the source of direct voltage is comparatively high, so that a greater relative voltage variation will occur. Owing to this a troublesome variation size of the image on the projection screen of the cathode-ray tube will occur and, moreover, if magnetic focussing of the cathode-ray beam is used, this focussing proves no longer correct.

The circuit according to the invention, which meets these drawbacks, exhibits the feature that the circuit comprises a variable reactance which is varied in accordance with the load formed by the cathode-ray tube in such manner that the direct voltage is substantially constant at a constant maximum current strength of the sawtooth current in the deflecting coils.

In order that the invention may be clearly understood and readily carried into effect it will now be described more fully with reference to the accompanying drawing in which the principle of

2 the invention will be explained with reference to Fig. 1.

Fig. 7 is a further embodiment of the invention utilizing the structure shown in Fig. 6.

Figure 1:
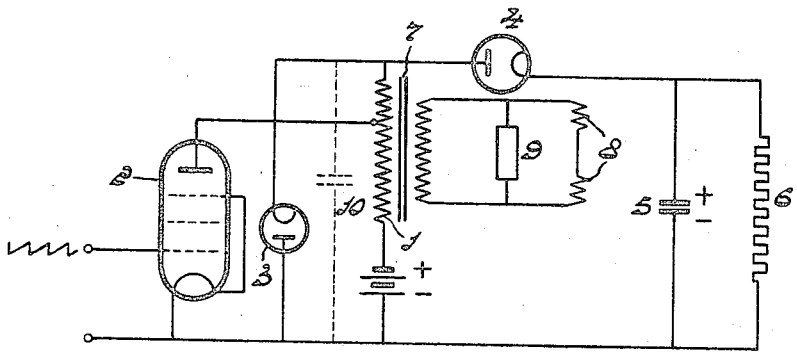
Figure 1 is a representation of the applicants' circuit included for the purpose of explanation.

In Figure 1 the reference numeral 1 designates an inductance coil in which a sawtooth current is produced by means of a sawtooth generator. The latter comprises a pentode 2 and a diode 3 which, together, under the influence of a sawtooth voltage applied to the control grid of the pentode, cause a sawtooth current to flow through the inductance 1. Owing to the diode 3 the voltage across coil 1 remains constant during the stroke. The voltage pulses set up at coil 1 upon the flyback of the sawtooth current are rectified by means of a diode 4, with the result that a direct voltage is set up through the condenser 5. This direct voltage may then be supplied to the cathode-ray tube (not represented), the load of which, is represented diagrammatically by the resistance 6.

For the sake of simplicity the drawing represents a rectifying circuit without voltage multiplication, but hereinafter the general case will be explained in which voltage multiplication is used, without departing from the principle underlying the invention.

From coil 1 which, in the present case, constitutes the primary of a transformer 7, a sawtooth current is also taken, by means of this transformer, for the coils 8 which serve for deflection of the cathode-ray beam of the cathode-ray tube. A reactance 9 is connected in parallel with coils 8.

If, as shown in the drawing, single rectification takes place and the source of direct voltage is unloaded, the relation $\tfrac{1}{2}Li_m^2 = \tfrac{1}{2}C_0V_h^2$ holds in the absence of reactance 9, in which relation L represents the total inductance transformed e. g. to the primary side of transformer 7, $i_m$ the current which appears in the inductance at the end of the stroke of the sawtooth current, $C_0$ the total capacity transformed to the primary side (indicated in dotted lines by 10) and $V_h$ the direct voltage set up at the condenser 5.

If, in addition to the capacity $C_o$, there is a reactance 9 and if this has a capacitative character with a capacity $C_p$ transformed to the primary side of the transformer and, moreover, the rectifying circuit is designed as a circuit in which voltage multiplication with a factor $n$ occurs, and a load current $i_h$ is taken from the load resistance 6, we have:

$$\tfrac{1}{2}Li_m^2 = \tfrac{1}{2}C_o V_h^2 + \tfrac{1}{2}C_p V_h^2 + nV_h i_h t_z$$

in which the term $nV_h i_h t_z$ represents the energy output per cycle $t_z$ of the sawtooth current.

In order to maintain a constant direct voltage $V_h$ for any load current $i_h$, $\tfrac{1}{2}C_p V_h^2 + nV_h i_h t_z$ should be equal to the arbitrary constant A since the term of the first member is also constant, whence it follows:

$$C_p = \frac{2A}{V_h^2} - \frac{2nt_z}{V_h} i_h$$

Figure 2:
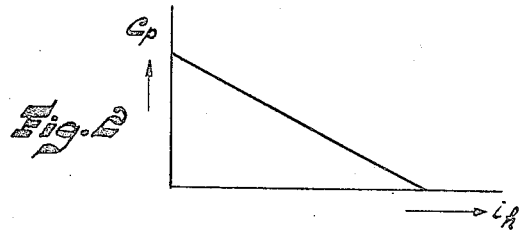
Fig. 2 is a graphical representation of the conditions to be found in Fig. 1.

Consequently the parallel-connected capitative reactance $C_p$ should be linearly dependent upon the load current $i_h$ and varies as shown in Figure 2.

If the parallel-connected reactance 9 has an inductive character with an inductance $L_p$ which inductance, for the sake of simplicity, is thought not to be transformed to the primary side of the transformer in the present case, so that the corresponding current $i_p$ is also imagined to be not transformed, we have, under the same aforesaid conditions:

$$\tfrac{1}{2}Li_m^2 + \tfrac{1}{2}L_p i_p^2 = \tfrac{1}{2}C_o V_h^2 + nV_h i_h t_z$$

in which $i_p$ represents the maximum current strength through the inductance $L_p$. Hence $\Delta(\tfrac{1}{2}L_p i_p^2) = nV_h i_h t_z$. However, there exists a relation between $L_p$ and $i_p$. The voltage V on $L_p$ is, in effect, constant during the stroke of the sawtooth current, and during the stroke the current varies from the value $-i_p$ to the value $+i_p$. Now $$L_p \frac{di_p}{dt} = V$$

which in this case approximately changes to $$L_p \frac{2i_p}{t_z} = V$$

so that the necessary condition now runs:

$$\Delta\left(\frac{V^2 t_z^2}{8L_p}\right) = nV_h i_h t_z$$

If the variable inductance $L_p$ is written $L_{po} - \Delta L_p$ where $L_{po}$ represents the value of $L_p$ if $i_h = 0$ we have:

$$\frac{V^2 t_z^2}{8(L_{po} - \Delta L_p)} - \frac{V^2 t_z^2}{8 L_{po}} = nV_h i_h t_z$$

or if the constant $$\frac{V^2 t_z^2}{8}$$

is represented by $a$ and the constant $nV_h t_z$ by $b$:

$$\frac{a}{L_{po} - \Delta L_p} - \frac{a}{L_{po}} = bi_h \text{ hence } \Delta L_p = \frac{bL_{po}^2 i_h}{a + bL_{po} i_h}$$

Figures 3, 4:
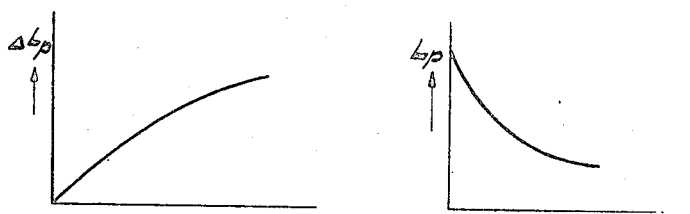
Fig. 3 is a graphical representation of other conditions to be found in Fig. 1.
Fig. 4 is a further graphical representation of other conditions to be found in Fig. 1.

In this case $\Delta L_p$ and $L_p = L_{po} - \Delta L_p$ depend upon $i_h$ in the manner as represented diagrammatically in Figures 3 and 4 respectively.

In one form of construction of the circuit according to the invention the variable reactance consists of a reactance tube, the mutual conductance of which is varied in accordance with the load.

In this way both a capacitative and an inductive variable reactance are obtained.

Figure 5:
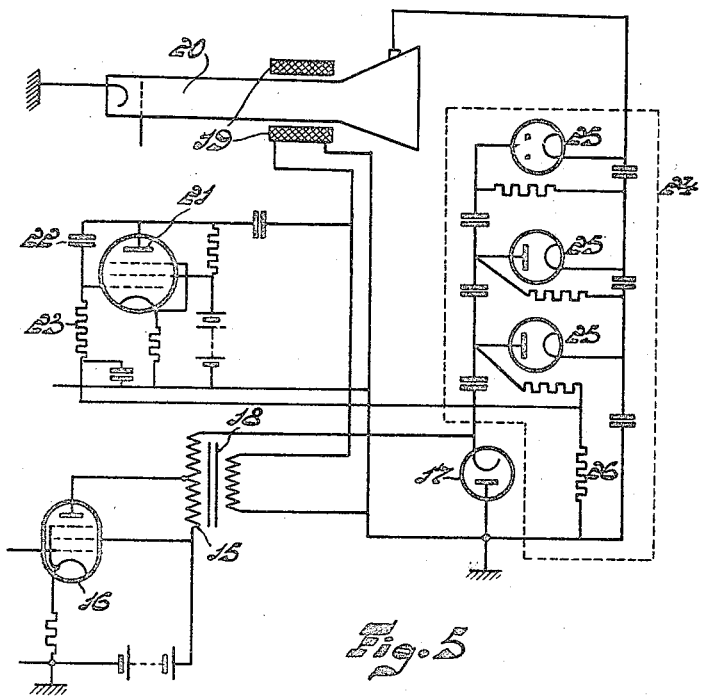
Fig. 5 is a preferred embodiment of the invention.
Figure 6:
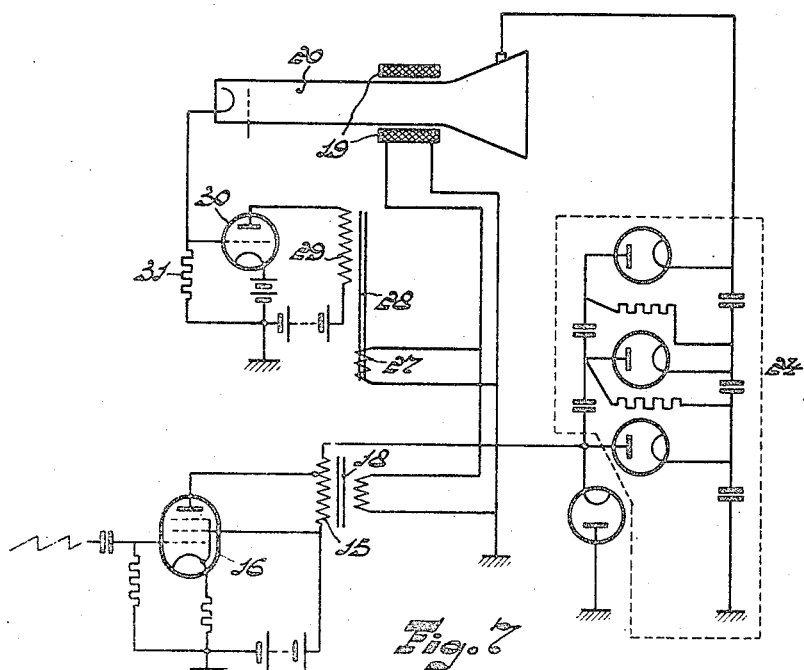

Such a circuit is shown in Figure 5.

In coil 15 a sawtooth current is produced by means of a sawtooth generator comprising a pentode tube 16 and the diode 17. From coil 15, which serves as a primary winding of transformer 18, a sawtooth current is taken for the deflecting coils 19 of the cathode-ray tube 20. A reactance tube 21 is connected in parallel with these coils. To the control grid of this tube, which is designed as a pentode, a voltage, which is displaced in phase by 90° with respect to the anode voltage of the tube, is applied in a known manner through the intermediary of a potentiometer consisting of a capacity 22 and a resistance 23. If the mutual conductance of the tube be S, the capacity 22 be C and the resistance 23 be R, the tube behaves as a capacity CRS, the value of which consequently varies with variable S.

The mutual conductance S of tube 21 is now varied in accordance with the load of the source of high voltage 24. The high direct voltage is obtained by rectifying the voltage pulses which appear in coil 15 during the flyback of the sawtooth current. The rectifier circuit comprises three cascade-connected rectifiers 25 connected by direct resistances and condensers so that both rectification and voltage multiplication occurs and this, in the circuit as represented, with a factor $n=3$. The direct voltage obtained is applied to the anode of cathode-ray tube 20. A variation of the load involves a voltage variation across resistance 26, which variable voltage is applied to the control grid of reactance tube 21, as a result of which the mutual conductance of the tube is altered. Upon an increase in high voltage load the grid voltage of tube 21 falls off, due to which the mutual conductance and consequently also the apparent capacity decrease.

It is pointed out that the capacitative reactance may be replaced by an inductive reactance if, for instance, the capacity 22 is replaced by a resistance, and the resistance 23 by a capacity.

In a further form of construction the variable reactance consists of a coil having a core of magnetic material, of which core the magnetisation is controlled in accordance with the load.

Figure 6:
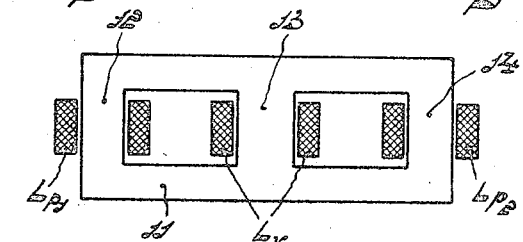
Fig. 6 is a sectional view of an element utilized in the invention.

Such a coil with core is shown in Figure 6. In this case the core 11 of magnetic material consists of a circuit having three limbs 12, 13 and 14. On the middle limb 13 is provided a winding $L_v$ through which passes a control current which depends upon the load of the source of direct voltage. By this control current the magnetisation of the circuit is varied as desired. The coils $L_{p1}$ and $L_{p2}$ are wound on the limbs 12 and 14.

The series-connection of these two coils forms the coil connected in parallel with the deflecting coils. They are connected in series in such manner that the mutual inductance between the coil formed by them and the coil traversed by the control current $=0$.

In the circuit shown in Figure 1, coil $L_v$ may, for instance, be connected in series with the load resistance 6. In this case the load current of the source of direct voltage is consequently used at the same time as a control current for the variable reactance.

As an alternative, coil $L_v$ may be inserted in the anode circuit of the discharge tube, to whose control grid is supplied a voltage which depends upon the load of the source of direct voltage.

Such a circuit is shown in Figure 7. The parts in this figure, which correspond to those of the circuit shown in Figure 5, bear the same reference numeral.

In this circuit a coil 27 which is wound on a core of magnetic material 28, is connected in parallel with the deflecting coils 19. The magnetisation of this core is controlled by a winding 29 inserted in the anode circuit of a discharge tube 30. The control grid voltage for this tube is taken from a resistance 31 inserted in the cathode lead of the cathode-ray tube. The voltage across this resistance consequently varies with the current strength in the tube and thus the magnetisation of core 28 is controlled.

What we claim is:

1. A voltage stabilized power supply for a load comprising an inductive element, means to effect a current flow through said inductive element having a saw tooth wave shape, a cathode ray system having a deflection coil, means to couple the latter deflection coil electromagnetically to the said inductive element, rectifying means to derive a unidirectional voltage from the said inductive element, and means to stabilize the magnitude of the said unidirectional voltage, said latter means comprising a reactive element coupled to the deflection coil of the said cathode ray system and means connected to said load to vary the value of said reactive element in accordance with changes in the said unidirectional voltage.

2. A voltage stabilized power supply comprising an inductive element, means to effect a current flow through said inductive element having a saw tooth wave shape, a cathode ray system having a deflection coil, means to couple the latter deflection coil electromagnetically to the said inductive element, rectifying means to derive a unidirectional voltage from the said inductive element, a reactance tube in parallel with the deflection coil of the said cathode ray system, said reactance tube having a control electrode to vary the reactance of the said tube, and means to apply a control voltage to the control electrode of the said reactance tube in proportion to the magnitude of the said unidirectional voltage.

3. A voltage stabilized power supply for a load comprising a first inductive element, means to effect a current flow through said first inductive element having a saw tooth wave shape, a cathode ray system having a deflection coil, means to couple the latter deflection coil electromagnetically to the said first inductive element, rectifying means to derive a unidirectional voltage from the said inductive element, a second inductive element having a core of magnetic material connected in parallel with the deflection coil of the said cathode ray system, and means connected to said load to vary the magnetization of the core of the said second inductive element in proportion to the magnitude of the said unidirectional voltage.

4. A voltage stabilized power supply comprising a first inductive element, means to effect a current flow through said first inductive element having a saw tooth wave shape, a cathode ray system having a deflection coil, means to couple the latter deflection coil electromagnetically to the said first inductive element, rectifying means to derive a unidirectional voltage from the said inductive element, a second inductive element having a core of magnetic material, a plurality of windings, a control winding, means to interconnect the plurality of windings to cancel the mutual inductance between said plurality of windings and the control coil, means to couple the said interconnected plurality of windings in parallel with the deflection coil of the said cathode ray system, and means to apply a voltage to the control coil of the said second inductive element in accordance with changes in the said unidirectional voltage.

5. A voltage stabilized power supply comprising a first inductive element, means to effect a current flow through said first inductive element having a saw tooth wave shape, a cathode ray system having a deflection coil, means to couple the latter deflection coil electromagnetically to the said first inductive element, rectifying means to derive a unidirectional voltage from the said inductive element, a load stage connected to said rectifying means, a second inductive element having a core of magnetic material, a plurality of windings, a control winding, means to interconnect the plurality of windings in a manner at which the mutual inductance between said plurality of windings and the control coil is cancelled, means to couple the said interconnected plurality of windings in parallel with the deflection coil of the said cathode ray system, and means to couple the control winding in series with a connection between the said load stage and the rectifying means.

6. A voltage stabilized power supply comprising a first inductive element, means to effect a current flow through said first inductive element having a saw tooth wave shape, a cathode ray system having a deflection coil, means to couple the latter deflection coil electromagnetically to the said first inductive element, rectifying means to derive a unidirectional voltage from the said inductive element, a second inductive element having a core of magnetic material, a plurality of windings, a control winding, means to interconnect the plurality of windings in a manner at which the mutual inductance between said plurality of windings and the control coil is cancelled, means to couple the said interconnected plurality of windings in parallel with the deflection coil of the said cathode ray system, a thermionic discharge tube having a cathode and control and output electrodes, means to couple said control coil of the second inductive element in the cathode-output electrode circuit of said thermionic discharge tube, and means to couple the said control electrode-cathode circuit to the unidirectional voltage.

JOHAN HAANTJES.
BERNARDUS WILLEM van INGEN SCHENAU.

REFERENCES CITED

The following references are of record in the file of this patent:

UNITED STATES PATENTS

| Number | Name | Date |
|---|---|---|
| 2,074,495 | Vance | Mar. 23, 1937 |
| 2,188,647 | Busse | Jan. 30, 1940 |
| 2,265,620 | Bahring | Dec. 9, 1941 |
| 2,397,150 | Lyman | Mar. 26, 1946 |
| 2,440,418 | Tourshou | Apr. 27, 1948 |
| 2,443,030 | Foster | June 8, 1948 |